United States Patent
Ide et al.

(10) Patent No.: US 7,800,866 B2
(45) Date of Patent: Sep. 21, 2010

(54) MAGNETIC SENSING ELEMENT CONTAINING QUATERNARY HEUSLER ALLOY $CO_2MN$ ($GE_{1-x}SN_x$) WHICH CONSTITUTES A FREE MAGNETIC LAYER OR PINNED MAGNETIC LAYER

(75) Inventors: Yosuke Ide, Niigata-ken (JP);
Masamichi Saito, Niigata-ken (JP);
Masahiko Ishizone, Niigata-ken (JP);
Naoya Hasegawa, Niigata-ken (JP)

(73) Assignee: TDK Corporation, Tokyo (JP)

( * ) Notice: Subject to any disclaimer, the term of this patent is extended or adjusted under 35 U.S.C. 154(b) by 1218 days.

(21) Appl. No.: 11/386,206

(22) Filed: Mar. 22, 2006

(65) Prior Publication Data

US 2006/0215330 A1 Sep. 28, 2006

(30) Foreign Application Priority Data

Mar. 28, 2005 (JP) .............................. 2005-090709

(51) Int. Cl.
*G11B 5/33* (2006.01)
(52) U.S. Cl. .................................................. 360/324.1
(58) Field of Classification Search ............... 360/324.1
See application file for complete search history.

(56) References Cited

U.S. PATENT DOCUMENTS

| | | | |
|---|---|---|---|
| 7,499,249 B2* | 3/2009 | Ide et al. ................. | 360/324.12 |
| 7,554,774 B2* | 6/2009 | Kim et al. ................ | 360/324.1 |
| 2003/0137785 A1 | 7/2003 | Saito | |
| 2006/0050446 A1* | 3/2006 | Ishizone et al. ........ | 360/324.12 |
| 2006/0268465 A1* | 11/2006 | Ide et al. ..................... | 360/313 |
| 2007/0115596 A1* | 5/2007 | Nakabayashi et al. ....... | 360/324 |

FOREIGN PATENT DOCUMENTS

| | | |
|---|---|---|
| GB | 2 406 962 | 4/2002 |
| GB | 2 387 711 | 10/2003 |
| JP | 2003-218428 | 7/2003 |
| JP | 2003-309305 | 10/2003 |
| JP | 2004-039941 | 2/2004 |
| JP | 2004-214251 | 7/2004 |

OTHER PUBLICATIONS

Search Report dated Jun. 2, 2006, for corresponding British Patent Application No. 0602064.8.

* cited by examiner

*Primary Examiner*—David D Davis
(74) *Attorney, Agent, or Firm*—Brinks Hofer Gilson & Lione (57) ABSTRACT

A magnetic sensing element is described, including a multilayer film including a pinned magnetic layer, a free magnetic layer disposed on the pinned magnetic layer with a nonmagnetic layer therebetween, wherein a current flows perpendicular to the surfaces of the individual layers of the multilayer film. The nonmagnetic layer is composed of Cu and has a face-centered cubic lattice crystal structure in which the {111} planes are preferentially oriented in a direction parallel to the surfaces of the layer. At least one of the pinned magnetic layer and the free magnetic layer includes a $Co_2Mn(Ge_{1-x}Sn_x)$ alloy layer, the subscript x satisfying the range of $0.2 \leq x \leq 0.8$; and the $Co_2Mn(Ge_{1-x}Sn_x)$ alloy layer has a body-centered cubic lattice crystal structure in which the {110} planes are preferentially oriented in a direction parallel to the surfaces of the layer.

3 Claims, 7 Drawing Sheets

MAGNETIC SENSING ELEMENT CONTAINING QUATERNARY HEUSLER ALLOY CO₂MN (GE$_{1-x}$SN$_x$) WHICH CONSTITUTES A FREE MAGNETIC LAYER OR PINNED MAGNETIC LAYER

This application claims the benefit of Japanese Application No.: 2005-090709, filed on Mar. 28, 2005 which is incorporated herein by reference.

TECHNICAL FIELD

The present application relates to magnetic sensing elements and, more particularly, to magnetic sensing elements in which read output amplitude can be increased.

BACKGROUND

Figure 8:
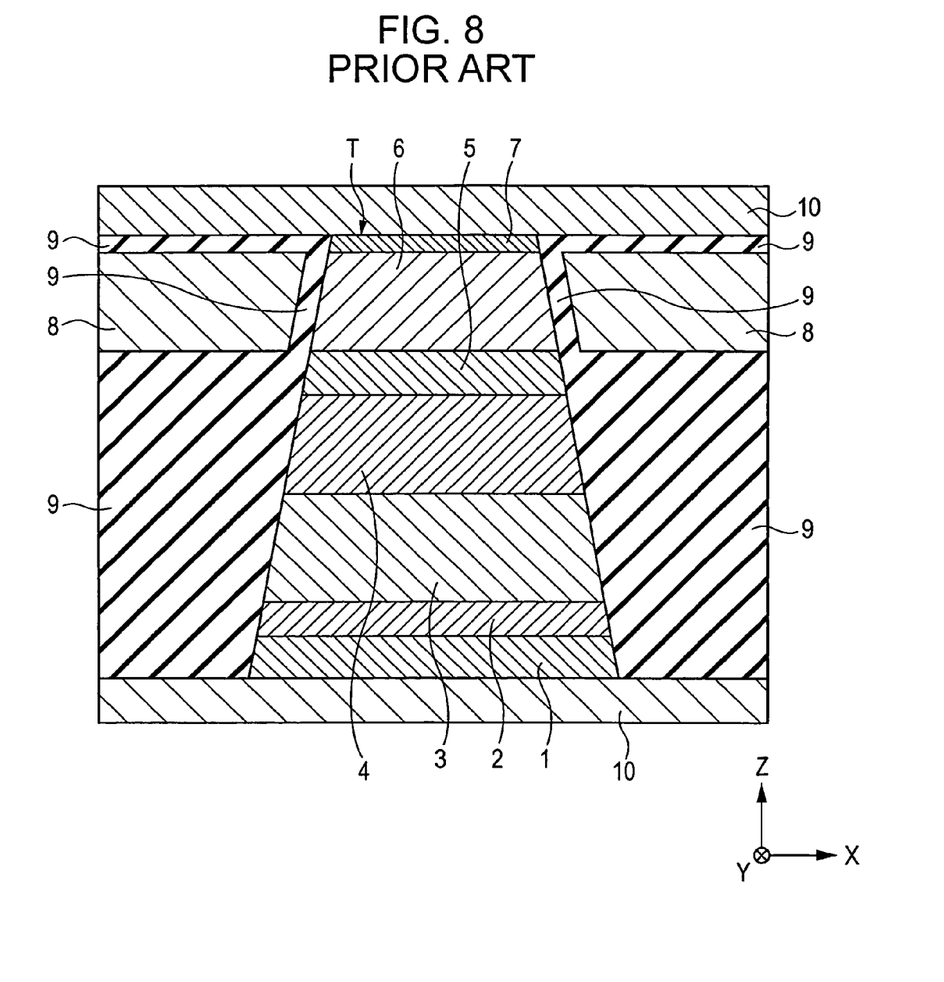
FIG. 8 is a sectional view of a conventional magnetic sensing element.

FIG. 8 is a partial sectional view of a conventional magnetic sensing element (spin-valve thin-film element), taken in a direction parallel to the surface facing a recording medium.

As shown in FIG. 8, a seed layer 2 composed of NiFeCr, or the like, is disposed on an underlayer 1 composed of Ta. A multilayer film T is disposed on the seed layer 2, the multilayer film T including an antiferromagnetic layer 3, a pinned magnetic layer 4, a nonmagnetic layer 5, a free magnetic layer 6, and a protective layer 7 deposited in that order from the bottom.

The free magnetic layer 6 and the pinned magnetic layer 4 are each composed of a Heusler alloy such as Co$_2$MnGe, the nonmagnetic layer 5 is composed of Cu, the antiferromagnetic layer 3 is composed of PtMn, and the protective layer 7 is composed of Ta.

An exchange coupling magnetic field is produced at the interface between the antiferromagnetic layer 3 and the pinned magnetic layer 4, and the magnetization of the pinned magnetic layer 4 is pinned in the height direction (in the Y direction).

Hard bias layers 8 composed of a hard magnetic material such as CoPt are disposed at both sides of the free magnetic layer 6. The top, bottom, and ends of each hard bias layer 8 are isolated by an insulating layer 9. The magnetization of the free magnetic layer 6 is aligned in the track width direction (in the X direction) by a longitudinal bias magnetic field from the hard bias layers 8. Electrode layers 10 are disposed on the top and bottom of the multilayer film T.

When an external magnetic field is applied to the magnetic sensing element shown in FIG. 8, the magnetization direction of the free magnetic layer 6 is changed relative to the magnetization direction of the pinned magnetic layer 4, resulting in a change in the resistance of the multilayer film T. When a sensing current with a constant current value flows, the change in the resistance is detected as a change in voltage, and thus the external magnetic field is detected.

A magnetic sensing element including a pinned magnetic layer composed of a Heusler alloy is described in Japanese Unexamined Patent Application Publication No. 2003-309305 (page 8 and FIG. 4).

The free magnetic layer 6 and the pinned magnetic layer 4 composed of a Heusler alloy, such as a Co$_2$MnGe alloy or a Co$_2$MnSi alloy, have a body-centered cubic lattice crystal structure in which the {110} planes are preferentially oriented in a direction parallel to the surfaces of the layer. The nonmagnetic layer 5 composed of Cu has a face-centered cubic lattice crystal structure in which the {111} planes are preferentially oriented in a direction parallel to the surfaces of the layer.

In the conventional magnetic sensing element, the free magnetic layer 6 and the pinned magnetic layer 4 have the crystal structure that is different from the crystal structure of the nonmagnetic layer 5. Moreover, there is a large difference in lattice constant between them. Therefore, the degree of lattice matching between the free magnetic layer 6 and the nonmagnetic layer 5 and the degree of lattice matching between the pinned magnetic layer 4 and the nonmagnetic layer 5 is low. Consequently, lattice defects occur in the free magnetic layer 6 and the pinned magnetic layer 5. For example, irregular phases in which the L$_{21}$-type crystal structure is not allowed are generated. As a result, the spin-dependent bulk scattering coefficient β of the free magnetic layer 6 or the pinned magnetic layer 5 is decreased. Furthermore, diffusion at the interface between the Heusler alloy and the nonmagnetic layer 5 easily occurs, and as a result, the spin-dependent interface scattering coefficient γ at the interface between the free magnetic layer 6 and the nonmagnetic layer 5 or at the interface between the pinned magnetic layer 4 and the nonmagnetic layer 5 is decreased.

The decrease in the spin-dependent bulk scattering coefficient β of the free magnetic layer 6 or the pinned magnetic layer 5 and the decrease in the spin-dependent interface scattering coefficient γ at the interface between the free magnetic layer 6 and the nonmagnetic layer 5 or between the pinned magnetic layer 4 and the nonmagnetic layer cause a decrease in the read output of the magnetic sensing element.

SUMMARY

A magnetic sensing element is described, that includes a multilayer film including a pinned magnetic layer whose magnetization is pinned in one direction, a free magnetic layer disposed on the pinned magnetic layer, with a nonmagnetic layer therebetween. A current flows perpendicular to the surfaces of the individual layers of the multilayer film. The nonmagnetic layer is composed of Cu and has a face-centered cubic lattice crystal structure in which the {111} planes are preferentially oriented in a direction parallel to the surfaces of the layer. At least one of the pinned magnetic layer and the free magnetic layer includes a Co$_2$Mn(Ge$_{1-x}$Sn$_x$) alloy layer, the subscript x satisfying the range of 0.2≦x≦0.8; and the Co$_2$Mn(Ge$_{1-x}$Sn$_x$) alloy layer has a body-centered cubic lattice crystal structure in which the {110} planes are preferentially oriented in a direction parallel to the surfaces of the layer.

By using a Co$_2$Mn(Ge$_{1-x}$Sn$_x$) alloy for the pinned magnetic layer or the free magnetic layer and by adjusting the compositional ratio between the element Ge and the element Sn, the lattice constant of the pinned magnetic layer or the free magnetic layer is controlled. In this manner, the degree of lattice matching between the nonmagnetic layer and the free magnetic layer or the degree of lattice matching between the nonmagnetic layer and the pinned magnetic layer may be improved. The free magnetic layer or the pinned magnetic layer can easily have the L$_{21}$-type crystal structure, thus improving the spin-dependent bulk scattering coefficient β in the free magnetic layer or the pinned magnetic layer. Furthermore, the Co$_2$Mn(Ge$_{1-x}$Sn$_x$) alloy does not easily diffuse into the nonmagnetic layer, and thus the spin-dependent interface scattering coefficient γ at the interface between the free magnetic layer and the nonmagnetic layer or at the interface between the pinned magnetic layer and the nonmagnetic layer is improved. Consequently, it is possible to increase the read output amplitude of the magnetic sensing element.

In the Co$_2$Mn(Ge$_{1-x}$Sn$_x$) alloy, the proportion of Co is twice the proportion of Mn and twice the sum of the proportions of Ge and Sn, and the proportion of Mn is equal to the sum of the proportions of Ge and Sn.

In an aspect, the absolute value of the difference between the interplanar spacing d1 of the nonmagnetic layer in the direction perpendicular to the surfaces of the layer and the interplanar spacing d2 of the free magnetic layer in the direction perpendicular to the surfaces of the layer may be 0.025 Å or less. The absolute value of the difference between the interplanar spacing d1 of the nonmagnetic layer in the direction perpendicular to the surfaces of the layer and the interplanar spacing d3 of the pinned magnetic layer in the direction perpendicular to the surfaces of the layer may 0.025 Å or less.

In another aspect, a magnetic sensing element includes a multilayer film including a pinned magnetic layer whose magnetization is pinned in one direction, a free magnetic layer disposed on the pinned magnetic layer with a nonmagnetic layer therebetween, wherein a current flows perpendicular to the surfaces of the individual layers of the multilayer film. The nonmagnetic layer is composed of Cu and has a face-centered cubic lattice crystal structure in which the {111} planes may be oriented in a direction parallel to the surfaces of the layer. At least one of the pinned magnetic layer and the free magnetic layer includes a $Co_2Mn(Si_{1-x}Sn_x)$ alloy layer, the subscript x being in the range of $0.3 \leq x \leq 0.9$; and the $Co_2Mn(Si_{1-x}Sn_x)$ alloy layer has a body-centered cubic lattice crystal structure in which the {110} planes may be oriented in a direction parallel to the surfaces of the layer.

By using a $Co_2Mn(Si_{1-x}Sn_x)$ alloy for the pinned magnetic layer or the free magnetic layer and by adjusting the compositional ratio between the element Si and the element Sn, the lattice constant of the pinned magnetic layer or the free magnetic layer is controlled. In this manner, the degree of lattice matching between the nonmagnetic layer and the free magnetic layer or the degree of lattice matching between the nonmagnetic layer and the pinned magnetic layer may be improved, and the free magnetic layer or the pinned magnetic layer may have the $L_{21}$-type crystal structure, thus improving the spin-dependent bulk scattering coefficient β in the free magnetic layer or the pinned magnetic layer. Furthermore, the $Co_2Mn(Si_{1-x}Sn_x)$ alloy may not easily diffuse into the nonmagnetic layer, and thus the spin-dependent interface scattering coefficient γ at the interface between the free magnetic layer and the nonmagnetic layer or at the interface between the pinned magnetic layer and the nonmagnetic layer may be improved. Consequently, it may be possible to increase the read output amplitude of the magnetic sensing element.

In the $Co_2Mn(Si_{1-x}Sn_x)$ alloy, the proportion of Co is twice the proportion of Mn and twice the sum of the proportions of Si and Sn, and the proportion of Mn is equal to the sum of the proportions of Si and Sn.

In another aspect, the absolute value of the difference between the interplanar spacing d1 of the nonmagnetic layer in the direction perpendicular to the surfaces of the layer and the interplanar spacing d2 of the free magnetic layer in the direction perpendicular to the surfaces of the layer may be 0.032 Å or less. The absolute value of the difference between the interplanar spacing d1 of the nonmagnetic layer in the direction perpendicular to the surfaces of the layer and the interplanar spacing d3 of the pinned magnetic layer in the direction perpendicular to the surfaces of the layer may be 0.032 Å or less.

The magnetic sensing element of the present invention may be, for example, a top spin-valve-type CPP (current-perpendicular-to-the-plane)-GMR magnetic sensing element in which the pinned magnetic layer is disposed above the free magnetic layer.

Alternatively, the magnetic sensing element may be a bottom spin-valve-type CPP-GMR magnetic sensing element in which the pinned magnetic layer is disposed below the free magnetic layer.

In another alternative, the magnetic sensing element may be a dual spin-valve-type CPP-GMR magnetic sensing element in which the nonmagnetic layer and the pinned magnetic layer are disposed under the free magnetic layer and another nonmagnetic layer and another pinned magnetic layer are disposed over the free magnetic layer.

By overlaying an antiferromagnetic layer on the pinned magnetic layer, the magnetization direction of the pinned magnetic layer is pinned.

By using a $Co_2Mn(Ge_{1-x}Sn_x)$ alloy for the pinned magnetic layer or the free magnetic layer and by adjusting the compositional ratio between the element Ge and the element Sn, the lattice constant of the pinned magnetic layer or the free magnetic layer may be controlled.

Alternatively, by using a $Co_2Mn(Si_{1-x}Sn_x)$ alloy for the pinned magnetic layer or the free magnetic layer and by adjusting the compositional ratio between the element Si and the element Sn, the lattice constant of the pinned magnetic layer or the free magnetic layer may be controlled.

In this manner, the degree of lattice matching between the nonmagnetic layer and the free magnetic layer or the degree of lattice matching between the nonmagnetic layer and the pinned magnetic layer may be improved, and the free magnetic layer or the pinned magnetic layer can easily have the $L_{21}$-type crystal structure, thus improving the spin-dependent bulk scattering coefficient β in the free magnetic layer or the pinned magnetic layer. Furthermore, the $Co_2Mn(Ge_{1-x}Sn_x)$ alloy or the $Co_2Mn(Si_{1-x}Sn_x)$ alloy may not easily diffuse into the nonmagnetic layer, and thus the spin-dependent interface scattering coefficient γ at the interface between the free magnetic layer and the nonmagnetic layer or at the interface between the pinned magnetic layer and the nonmagnetic layer may be improved. Consequently, it may be possible to increase the read output amplitude of the magnetic sensing element.

DETAILED DESCRIPTION

Exemplary embodiments may be better understood with reference to the drawings, but these examples are not intended to be of a limiting nature. Like numbered elements in the same or different drawings perform equivalent functions.

Figure 1:
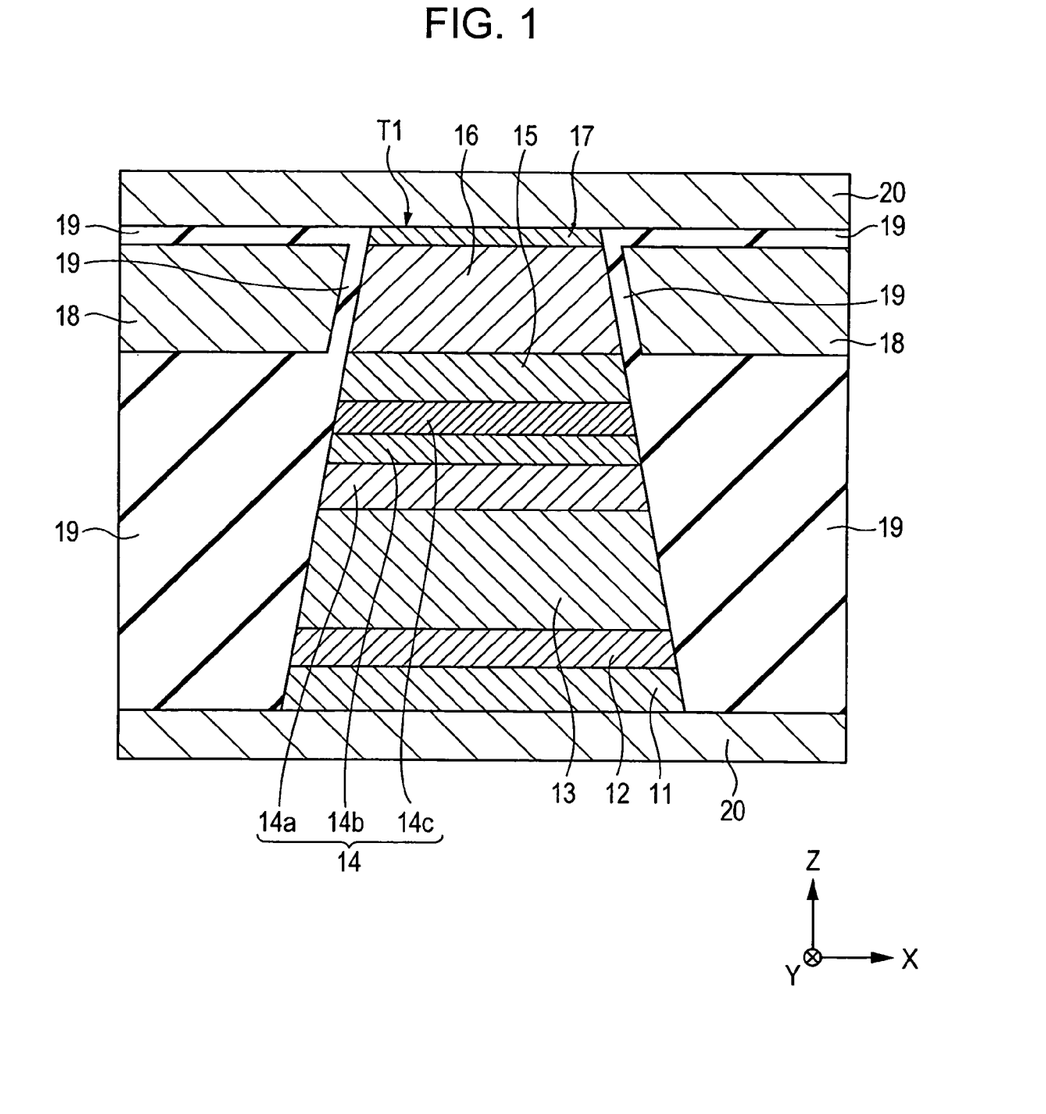
FIG. 1 is a sectional view of a magnetic sensing element (single spin-valve magnetoresistive element) according to a first example, viewed from the surface facing a recording medium.

FIG. 1 is a sectional view showing an overall structure of a magnetic sensing element (single spin-valve magnetoresistive element) in a first example, as viewed from the surface facing a recording medium. The figure shows only a central portion of the element extending in the X direction.

A single spin-valve magnetoresistive element is disposed on the trailing end of a floating-type slider provided for use with a hard disk drive or the like to detect a recorded magnetic field of a hard disk or the like. A magnetic recording medium, such as a hard disk, travels in the Z direction, and a leakage magnetic field from the magnetic recording medium is applied in the Y direction.

An underlayer 11 is composed of a nonmagnetic material, such as at least one element selected from the group consisting of Ta, Hf, Nb, Zr, Ti, Mo, and W. A multilayer film T1 is formed on the underlayer 11 by a thin-film forming process, such as sputtering or vapor deposition, the multilayer film T1 including a seed layer 12, an antiferromagnetic layer 13, a pinned magnetic layer 14, a nonmagnetic layer 15, a free magnetic layer 16, and a protective layer 17. The magnetic sensing element shown in FIG. 1 is a bottom spin-valve-type GMR sensing element in which the antiferromagnetic layer 13 is provided below the free magnetic layer 16.

The seed layer 12 is composed of NiFeCr or Cr. When the seed layer 12 is composed of NiFeCr, the seed layer 12 has a face-centered cubic (fcc) structure in which the equivalent crystal planes represented by the {111} planes are generally oriented in a direction parallel to the surfaces of the layer. When the seed layer 12 is composed of Cr, the seed layer 12 has a body-centered cubic (bcc) structure in which the equivalent crystal planes represented by the {110} planes are generally oriented in a direction parallel to the surfaces of the layer.

The underlayer 11 is an approximately amorphous structure and may be omitted.

The antiferromagnetic layer 13 disposed on the seed layer 12 may be composed of an antiferromagnetic material containing X and Mn, wherein X is at least one element selected from the group consisting of Pt, Pd, Ir, Rh, Ru, and Os.

The antiferromagnetic layer 13 has a face-centered cubic (fcc) structure or a face-centered tetragonal (fct) structure.

The X—Mn alloy, including an element of the platinum group, has characteristics suitable for use as an antiferromagnetic material, such as excellent corrosion resistance, high blocking temperature, and capability of increasing an exchange coupling magnetic field (Hex). For example, a binary PtMn alloy or IrMn alloy can be used.

The antiferromagnetic layer 13 may also be composed of an antiferromagnetic material containing X, X', and Mn, wherein X' is at least one element selected from the group consisting of Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Sn, Hf, Ta, W, Re, Au, Pb, and rare-earth elements.

Atoms of X' enter interstices in a space lattice composed of X and Mn, or atoms of X' may be substituted for some atoms at the lattice points of a crystal lattice composed of X and Mn, to form a solid solution. The term "solid solution" is defined as a solid in which the constituents are generally homogeneously mixed.

By forming the interstitial solid solution or substitutional solid solution, the lattice constant of the X—Mn—X' alloy can be larger than that of the X—Mn alloy. As such, the difference in the lattice constant between the antiferromagnetic layer 13 and the pinned magnetic layer 14 can be increased, and the interface structure between the antiferromagnetic layer 13 and the pinned magnetic layer 14 can be formed in a noncoherent state. The noncoherent state is a state in which atoms constituting the antiferromagnetic layer 13 and atoms constituting the pinned magnetic layer 14 do not exhibit a one-to-one correspondence at the interface between the antiferromagnetic layer 13 and the pinned magnetic layer 14.

In particular, in the use of the element X' which forms a substitutional solid solution, if the compositional proportion of the element X' increases excessively, the antiferromagnetic characteristics may be degraded, resulting in a decrease in the magnitude of the exchange coupling magnetic field produced at the interface with the pinned magnetic layer 14. At least one noble gas element selected from the group consisting of Ne, Ar, Kr, and Xe is used as the element X', the noble gas element being an inert gas and forming an interstitial solid solution. Since the noble gas element is an inert gas, the noble gas element does not greatly affect the antiferromagnetic characteristics even if incorporated into the layer. Furthermore, Ar or the like may have been introduced into sputtering apparatuses as a sputtering gas, and it is possible to allow Ar to enter the layer by properly controlling the gas pressure.

It is difficult to allow the layer to contain a large amount of X' when a gaseous element is used as X'. However, in the case of a noble gas, only allowing a slight amount of the noble gas to enter the layer, makes it possible to significantly increase the exchange coupling magnetic field produced by annealing.

The X' content may be in a range of 0.2 atomic percent to 10 atomic percent, and more preferably in a range of 0.5 atomic percent to 5 atomic percent. Furthermore, X may preferably Pt, and a Pt—Mn—X' alloy may be used.

Furthermore, the X content or the X+X' content is in a range of 45 atomic percent to 60 atomic percent, and may be in a range of 49 atomic percent to 56.5 atomic percent. In the film formation step, the interface with the pinned magnetic layer 14 is formed in a noncoherent state. Moreover, properly ordered transformation may be assumed to be caused in the antiferromagnetic layer 13 by annealing.

The pinned magnetic layer 14 has a multilayer structure including a first pinned magnetic sublayer 14a, a nonmagnetic intermediate sublayer 14b, and a second pinned magnetic sublayer 14c. The magnetization directions of the first pinned magnetic sublayer 14a and the second pinned magnetic sublayer 14c are set antiparallel to each other by an exchange coupling magnetic field at the interface with the antiferromagnetic layer 13 and an antiferromagnetic exchange coupling magnetic field (RKKY interaction) through the nonmagnetic intermediate sublayer 14b, which is referred to as a synthetic ferrimagnetic state. Such a structure can stabilize the magnetization of the pinned magnetic layer 14 and also can increase the apparent exchange coupling magnetic field produced at the interface between the pinned magnetic layer 14 and the antiferromagnetic layer 13. The pinned magnetic layer 14 may be composed of the second pinned magnetic sublayer 14c only and not in a synthetic ferrimagnetic coupling state.

The first pinned magnetic sublayer 14a has a thickness of, for example, about 15 to 35 Å, the nonmagnetic intermediate sublayer 14b has a thickness of about 8 to 10 Å, and the second pinned magnetic sublayer 14c has a thickness of about 20 to 50 Å.

The first pinned magnetic sublayer 14a is composed of a ferromagnetic material, such as CoFe or NiFe. The nonmagnetic intermediate sublayer 14b is composed of a nonmagnetic conductive material, such as Ru, Rh, Ir, Cr, Re, or Cu.

The nonmagnetic layer 15 disposed on the pinned magnetic layer 14 is composed of Cu. The nonmagnetic layer 15 composed of Cu has a face-centered cubic (fcc) structure in which the equivalent crystal planes represented by the {111} planes may be oriented in a direction parallel to the surfaces of the layer. The term "{111} planes being oriented" means that the angle between any of the equivalent crystal planes represented by {111} planes and the direction parallel to the surfaces of the layer is acute. The free magnetic layer 16 is disposed on the nonmagnetic layer 15.

In the example shown in FIG. 1, hard bias layers 18 are disposed at both sides of the free magnetic layer 16. The magnetization of the free magnetic layer 16 is aligned in the track width direction (in the X direction) by a longitudinal bias magnetic field from the hard bias layers 18. The hard bias layers 18 are composed of, for example, a cobalt-platinum (Co—Pt) alloy or a cobalt-chromium-platinum (Co—Cr—Pt) alloy.

The top, bottom, and ends of each hard bias layer 18 is isolated by an insulating layer 19 composed of alumina or the like.

Electrode layers 20 are disposed on the top and bottom of the multilayer film T1. Thus, a CPP (current-perpendicular-to-the-plane)-GMR magnetic sensing element is provided, in which a sensing current flows perpendicular to the surfaces of the individual layers constituting the multilayer film T1.

The electrode layers 20 may be composed of α-Ta, Au, Cr, Cu, Rh, Ir, Ru, W, or the like.

After layers from the underlayer 11 to the protective layer 17 are deposited, annealing is performed to produce an exchange coupling magnetic field at the interface between the antiferromagnetic layer 13 and the pinned magnetic layer 14. In the annealing process, by orienting the magnetic field in a direction parallel to the Y direction, the magnetization direction of the pinned magnetic layer 14 is oriented and pinned in the direction parallel to the Y direction. Since the pinned magnetic layer 14 has the laminated ferrimagnetic structure, when the first pinned magnetic sublayer 14a is magnetized, for example, in the Y direction, the second pinned magnetic sublayer 14c is magnetized in a direction opposite thereto.

The magnetization directions of the pinned magnetic layer 14 and the free magnetic layer 16 are perpendicular to each other. When a leakage magnetic field from a recording medium is applied to the magnetic sensing element in the Y direction, and a magnetization direction of the free magnetic layer 16 is changed. Because of the relationship between the change in the magnetization direction and the pinned magnetization direction of the pinned magnetic layer 14, the electrical resistance changes. The change in the electrical resistance causes a change in voltage or a change in current. Thus, the leakage magnetic field from the recording medium is detected.

The nonmagnetic layer 15 composed of Cu has a face-centered cubic lattice crystal structure in which the {111} planes are preferentially oriented in a direction parallel to the surfaces of the layer. At least one of the second pinned magnetic sublayer 14c and the free magnetic layer 16 is a $Co_2Mn(Ge_{1-x}Sn_x)$ alloy layer, the subscript x satisfying the range of $0.2 \leq x \leq 0.8$. The second pinned magnetic sublayer 14c or the free magnetic layer 16 which is the $Co_2Mn(Ge_{1-x}Sn_x)$ alloy layer has a body-centered cubic lattice crystal structure in which the {110} planes may be oriented in a direction parallel to the surfaces of the layer.

By using a $Co_2Mn(Ge_{1-x}Sn_x)$ alloy for the second pinned magnetic sublayer 14c or the free magnetic layer 16 and by adjusting the compositional ratio between the element Ge and the element Sn, the lattice constant of the second pinned magnetic sublayer 14c or the free magnetic layer 16 is controlled. In this manner, the degree of lattice matching between the nonmagnetic layer 15 and the free magnetic layer 16 or the degree of lattice matching between the nonmagnetic layer 15 and the second pinned magnetic sublayer 14c may be improved, and the free magnetic layer 16 or the second pinned magnetic sublayer 14c can easily have the $L_{21}$-type crystal structure, thus improving the spin-dependent bulk scattering coefficient β in the free magnetic layer 16 or the second pinned magnetic sublayer 14c. Furthermore, the $Co_2Mn(Ge_{1-x}Sn_x)$ alloy does not easily diffuse into the nonmagnetic layer 15, and thus the spin-dependent interface scattering coefficient γ at the interface between the free magnetic layer 16 and the nonmagnetic layer 15 or at the interface between the second pinned magnetic sublayer 14c and the nonmagnetic layer 15 may be improved. Consequently, it may be possible to increase the read output amplitude of the magnetic sensing element.

In the $Co_2Mn(Ge_{1-x}Sn_x)$ alloy, the proportion of Co is twice the proportion of Mn and twice the sum of the proportions of Ge and Sn, and the proportion of Mn is equal to the sum of the proportions of Ge and Sn.

When the free magnetic layer 16 is a $Co_2Mn(Ge_{1-x}Sn_x)$ alloy layer and the nonmagnetic layer 15 is composed of Cu, the absolute value of the difference between the interplanar spacing d1 of the nonmagnetic layer 15 in the direction perpendicular to the surfaces of the layer and the interplanar spacing d2 of the free magnetic layer 16 in the direction perpendicular to the surfaces of the layer may 0.025 Å or less. When the second pinned magnetic sublayer 14c is a $Co_2Mn(Ge_{1-x}Sn_x)$ alloy layer and the nonmagnetic layer 15 is composed of Cu, preferably, the absolute value of the difference between the interplanar spacing d1 of the nonmagnetic layer 15 in the direction perpendicular to the surfaces of the layer and the interplanar spacing d3 of the second pinned magnetic sublayer 14c in the direction perpendicular to the surfaces of the layer may 0.025 Å or less.

Alternatively, at least one of the second pinned magnetic sublayer 14c and the free magnetic layer 16 may be a $Co_2Mn(Si_{1-x}Sn_x)$ alloy layer, the subscript x satisfying the range of $0.3 \leq x \leq 0.9$. The $Co_2Mn(Si_{1-x}Sn_x)$ alloy layer has a body-centered cubic lattice crystal structure in which the {110} planes may be oriented in the direction parallel to the surfaces of the layer.

By using a $Co_2Mn(Si_{1-x}Sn_x)$ alloy for the second pinned magnetic sublayer 14c or the free magnetic layer 16 and by adjusting the compositional ratio between the element Si and the element Sn, the lattice constant of the second pinned magnetic sublayer 14c or the free magnetic layer 16 is controlled. In this manner, the degree of lattice matching between the nonmagnetic layer 15 and the free magnetic layer 16 or the degree of lattice matching between the nonmagnetic layer 15 and the second pinned magnetic sublayer 14c may be improved, and the free magnetic layer 16 or the second pinned magnetic sublayer 14c may easily have the $L_{21}$-type crystal structure, thus improving the spin-dependent bulk scattering coefficient β in the free magnetic layer 16 or the second pinned magnetic sublayer 14c. Furthermore, the $Co_2Mn(Si_{1-}$ $_x$Sn$_x$) alloy does not easily diffuse into the nonmagnetic layer 15, and thus the spin-dependent interface scattering coefficient γy at the interface between the free magnetic layer 16 and the nonmagnetic layer 15 or at the interface between the second pinned magnetic sublayer 14c and the nonmagnetic layer 15 may be improved. Consequently, it may be possible to increase the read output amplitude of the magnetic sensing element.

In the Co$_2$Mn(Si$_{1-x}$Sn$_x$) alloy, the proportion of Co is twice the proportion of Mn and twice the sum of the proportions of Si and Sn, and the proportion of Mn is equal to the sum of the proportions of Si and Sn.

When the free magnetic layer 16 is a Co$_2$Mn(Si$_{1-x}$Sn$_x$) alloy layer and the nonmagnetic layer 15 is composed of Cu, the absolute value of the difference between the interplanar spacing d1 of the nonmagnetic layer 15 in the direction perpendicular to the surfaces of the layer and the interplanar spacing d2 of the free magnetic layer 16 in the direction perpendicular to the surfaces of the layer may be 0.032 Å or less. When the second pinned magnetic sublayer 14c is a Co$_2$Mn(Si$_{1-x}$Sn$_x$) alloy layer and the nonmagnetic layer 15 is composed of Cu, the absolute value of the difference between the interplanar spacing d1 of the nonmagnetic layer 15 in the direction perpendicular to the surfaces of the layer and the interplanar spacing d3 of the second pinned magnetic sublayer 14c in the direction perpendicular to the surfaces of the layer may be 0.032 Å or less.

Figure 4:
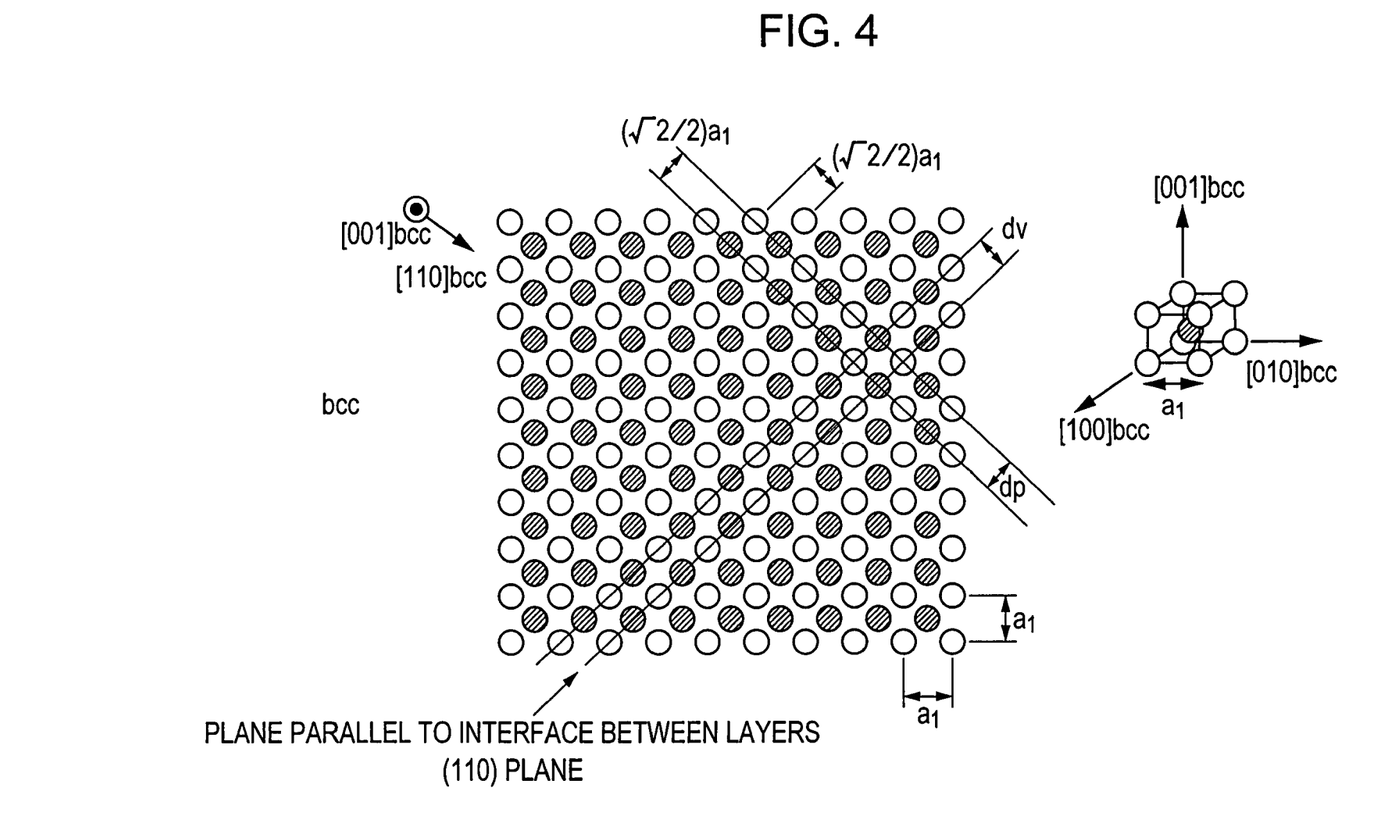
FIG. 4 is a plan view of a crystal lattice of a body-centered cubic lattice structure, viewed from a direction perpendicular to the (001) plane.

FIG. 4 is a plan view of a crystal lattice of a body-centered cubic (bcc) lattice structure, viewed from a direction perpendicular to the (001) plane. In the free magnetic layer or the pinned magnetic layer having the body-centered cubic lattice crystal structure in which the {110} planes are oriented in the direction parallel to the surfaces of the layer, the interplanar spacing dv in the direction perpendicular to the surfaces of the layer is equal to the interplanar spacing dp in the direction parallel to the surfaces of the layer.

Figure 5:
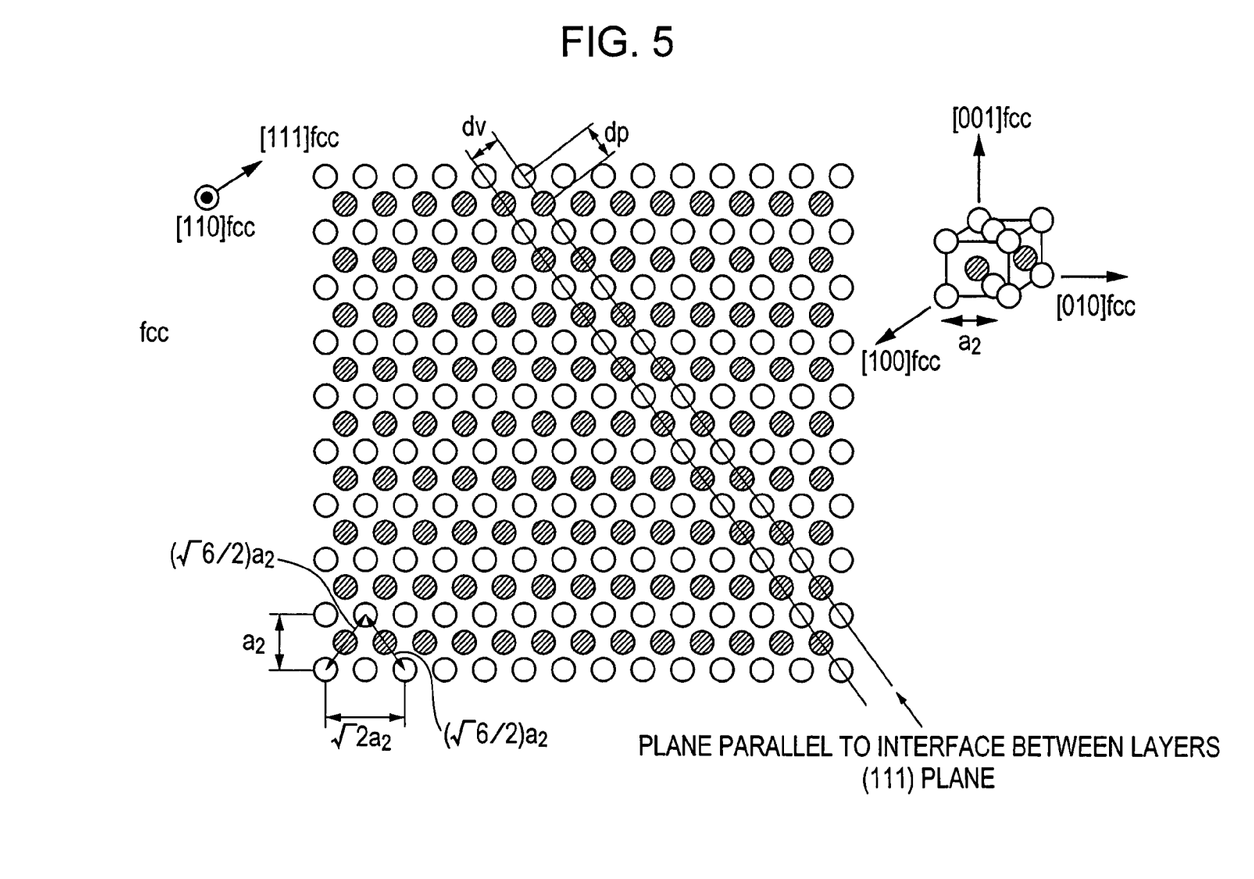
FIG. 5 is a plan view of a crystal lattice of a face-centered cubic lattice structure, viewed from a direction perpendicular to the (110) plane.

FIG. 5 is a plan view of a crystal lattice of a face-centered cubic (fcc) lattice structure, viewed from a direction perpendicular to the (110) plane. In the nonmagnetic layer having the face-centered cubic lattice structure in which the {111} planes are oriented in the direction parallel to the surfaces of the layer, the interplanar spacing dv in the direction perpendicular to the surfaces of the layer is substantially, although not exactly, equal to the interplanar spacing dp in the direction parallel to the surfaces of the layer.

Consequently, if the absolute value of the difference between the interplanar spacing d1 of the nonmagnetic layer in the direction perpendicular to the surfaces of the layer and the interplanar spacing d2 of the free magnetic layer in the direction perpendicular to the surfaces of the layer is decreased, the difference in the interplanar spacing between the nonmagnetic layer and the free magnetic layer in the direction parallel to the surfaces of the layers is also decreased, resulting in an improvement in the degree of lattice matching between the nonmagnetic layer and the free magnetic layer.

Similarly, if the absolute value of the difference between the interplanar spacing d1 of the nonmagnetic layer in the direction perpendicular to the surfaces of the layer and the interplanar spacing d3 of the pinned magnetic layer in the direction perpendicular to the surfaces of the layer is decreased, the difference in the interplanar spacing between the nonmagnetic layer and the pinned magnetic layer in the direction parallel to the surfaces of the layers is also decreased, resulting in an improvement in the degree of lattice matching between the nonmagnetic layer and the pinned magnetic layer.

The multilayer film T1 includes the pinned magnetic layer 14, the free magnetic layer 16 disposed on the pinned magnetic layer 14, and with the nonmagnetic layer 15 therebetween. A current flows perpendicular to the surfaces of the individual layers of the multilayer film, and at least one of the second pinned magnetic sublayer 14c and the free magnetic layer 16 includes a Co$_2$Mn(Si$_{1-x}$Sn$_x$) alloy layer or a Co$_2$Mn(Ge$_{1-x}$Sn$_x$) alloy layer. That is, the second pinned magnetic sublayer 14c and the free magnetic layer 16 each may be a laminate including a Co$_2$Mn(Si$_{1-x}$Sn$_x$) alloy layer or a Co$_2$Mn(Ge$_{1-x}$Sn$_x$) alloy layer and a CoFe layer, a NiFe layer, or the like. Alternatively, one of the second pinned magnetic sublayer 14c or the free magnetic layer 16 may include a Co$_2$Mn(Si$_{1-x}$Sn$_x$) alloy layer or a Co$_2$Mn(Ge$_{1-x}$Sn$_x$) alloy layer, and the other may be a CoFe layer or a NiFe layer.

Figure 2:
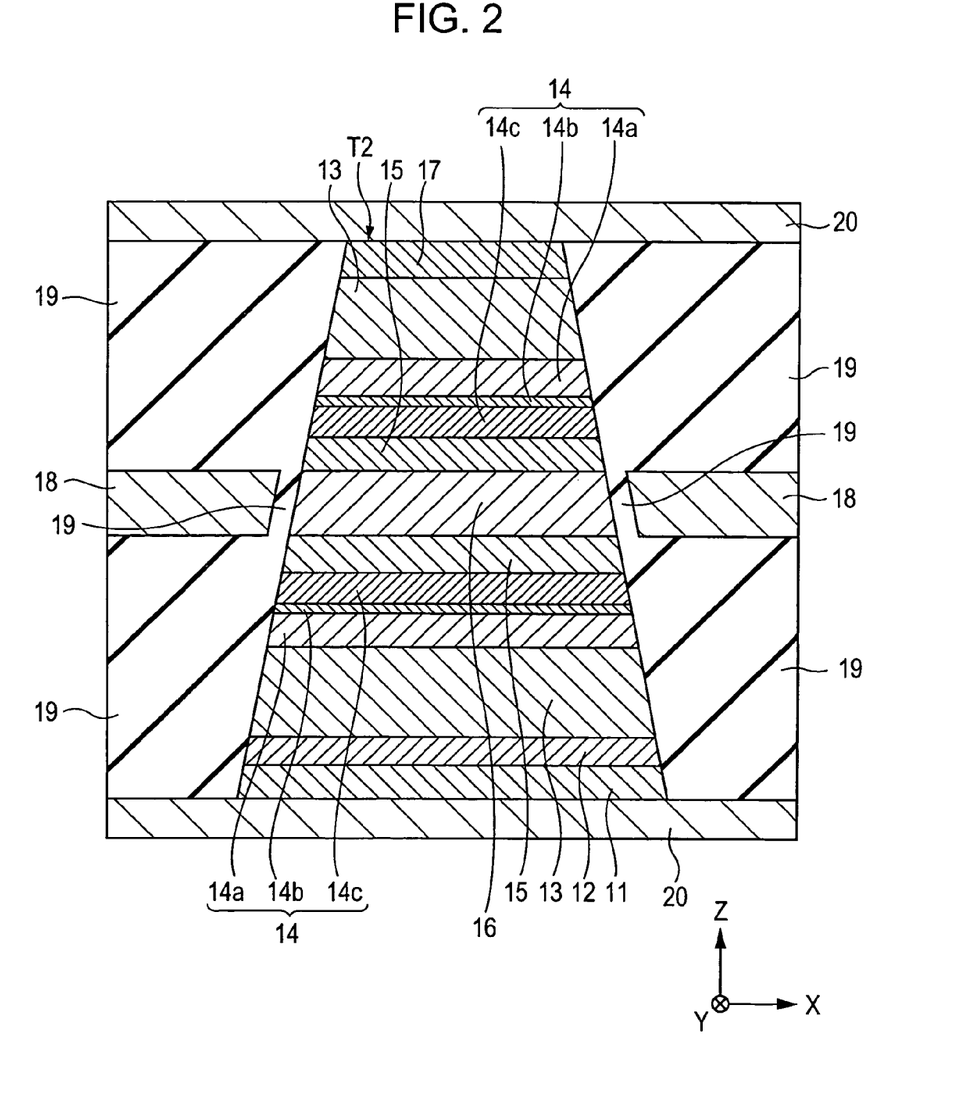
FIG. 2 is a sectional view of a magnetic sensing element (dual spin-valve magnetoresistive element) according to a second example, viewed from the surface facing a recording medium.

FIG. 2 is a partial sectional view which shows a structure of a dual spin-valve magnetic sensing element according to a second example.

In FIG. 2, the layers represented by the same reference numerals as those in FIG. 1 are composed of the same materials as those described with reference to FIG. 1.

An underlayer 11, a seed layer 12, an antiferromagnetic layer 13, a pinned magnetic layer 14, a nonmagnetic layer 15, and a free magnetic layer 16 are sequentially disposed from the bottom. A nonmagnetic layer 15, a pinned magnetic layer 14, an antiferromagnetic layer 13, and a protective layer 17 are sequentially disposed on the free magnetic layer 16, thus constituting a multilayer film T2.

Hard bias layers 18 are disposed at both sides of the free magnetic layer 16. Each hard bias layer 18 is isolated by an insulating layer 19 composed of alumina or the like.

Electrode layers 20 are disposed on the top and bottom of the multilayer film T2. Thus, a CPP (current-perpendicular-to-the-plane)-GMR magnetic sensing element is provided, in which a sensing current flows perpendicular to the surfaces of the individual layers constituting the multilayer film T2.

After layers from the underlayer 11 to the protective layer 17 are deposited, annealing is performed to produce an exchange coupling magnetic field at the interface between each antiferromagnetic layer 13 and each pinned magnetic layer 14. In the annealing process, by orienting the magnetic field in a direction parallel to the Y direction, the pinned magnetic layer 14 is magnetized in the direction parallel to the Y direction. The magnetization directions of the pinned magnetic layer 14 and the free magnetic layer 16 are perpendicular to each other. When a leakage magnetic field from a recording medium is applied to the magnetic sensing element in the Y direction, the magnetization direction of the free magnetic layer 16 is sensitively changed. Because of the relationship between the change in the magnetization direction and the pinned magnetization direction of the pinned magnetic layer 14, the electrical resistance changes. The change in the electrical resistance causes a change in voltage or a change in current. Thus, the leakage magnetic field from the recording medium is detected.

In this second example, the nonmagnetic layer 15 is composed of Cu and has a face-centered cubic structure in which the {111} planes may be oriented in the direction parallel to the surfaces of the layer, and at least one of the second pinned magnetic sublayer 14c and the free magnetic layer 16 is a Co$_2$Mn(Ge$_{1-x}$Sn$_x$) alloy layer, the subscript x satisfying the range of 0.2≦x≦0.8. The second pinned magnetic sublayer 14c or the free magnetic layer 16 which is the Co$_2$Mn(Ge$_{1-x}$Sn$_x$) alloy layer has a body-centered cubic lattice crystal structure in which the {110} planes may be oriented in the direction parallel to the surfaces of the layer.

By using a $Co_2Mn(Ge_{1-x}Sn_x)$ alloy for the second pinned magnetic sublayer 14c or the free magnetic layer 16 and by adjusting the compositional ratio between the element Ge and the element Sn, the lattice constant of the second pinned magnetic sublayer 14c or the free magnetic layer 16 may be controlled. In this manner, the degree of lattice matching between the nonmagnetic layer 15 and the free magnetic layer 16 or the degree of lattice matching between the nonmagnetic layer 15 and the second pinned magnetic sublayer 14c is improved, and the free magnetic layer 16 or the second pinned magnetic sublayer 14c can easily have the $L_{21}$-type crystal structure, thus improving the spin-dependent bulk scattering coefficient β in the free magnetic layer 16 or the second pinned magnetic sublayer 14c. Furthermore, the $Co_2Mn(Ge_{1-x}Sn_x)$ alloy may not easily diffuse into the nonmagnetic layer 15, and thus the spin-dependent interface scattering coefficient γ at the interface between the free magnetic layer 16 and the nonmagnetic layer 15 or at the interface between the second pinned magnetic sublayer 14c and the nonmagnetic layer 15 is improved. Consequently, it is possible to increase the read output amplitude of the magnetic sensing element.

In the $Co_2Mn(Ge_{1-x}Sn_x)$ alloy, the proportion of Co is twice the proportion of Mn and twice the sum of the proportions of Ge and Sn, and the proportion of Mn is equal to the sum of the proportions of Ge and Sn.

When the free magnetic layer 16 is a $Co_2Mn(Ge_{1-x}Sn_x)$ alloy layer and the nonmagnetic layer 15 is composed of Cu, the absolute value of the difference between the interplanar spacing d1 of the nonmagnetic layer 15 in the direction perpendicular to the surfaces of the layers and the interplanar spacing d2 of the free magnetic layer 16 in the direction perpendicular to the surfaces of the layers may be 0.025 Å or less. When the second pinned magnetic sublayer 14c is a $Co_2Mn(Ge_{1-x}Sn_x)$ alloy layer and the nonmagnetic layer 15 is composed of Cu, the absolute value of the difference between the interplanar spacing d1 of the nonmagnetic layer 15 in the direction perpendicular to the surfaces of the layer and the interplanar spacing d3 of the second pinned magnetic sublayer 14c in the direction perpendicular to the surfaces of the layer may be 0.025 Å or less.

Alternatively, at least one of the second pinned magnetic sublayer 14c and the free magnetic layer 16 may be a $Co_2Mn(Si_{1-x}Sn_x)$ alloy layer, the subscript x satisfying the range of 0.3≦x≦0.9. The $Co_2Mn(Si_{1-x}Sn_x)$ alloy layer has a body-centered cubic lattice crystal structure in which the {110} planes may be oriented in the direction parallel to the surfaces of the layer.

By using a $Co_2Mn(Si_{1-x}Sn_x)$ alloy for the second pinned magnetic sublayer 14c or the free magnetic layer 16 and by adjusting the compositional ratio between the element Si and the element Sn, the lattice constant of the second pinned magnetic sublayer 14c or the free magnetic layer 16 is controlled. In this manner, the degree of lattice matching between the nonmagnetic layer 15 and the free magnetic layer 16 or the degree of lattice matching between the nonmagnetic layer 15 and the second pinned magnetic sublayer 14c may be improved, and the free magnetic layer 16 or the second pinned magnetic sublayer 14c can easily have the $L_{21}$-type crystal structure, thus improving the spin-dependent bulk scattering coefficient β in the free magnetic layer 16 or the second pinned magnetic sublayer 14c. Furthermore, the $Co_2Mn(Si_{1-x}Sn_x)$ alloy may not easily diffuse into the nonmagnetic layer 15, and thus the spin-dependent interface scattering coefficient γ at the interface between the free magnetic layer 16 and the nonmagnetic layer 15 or at the interface between the second pinned magnetic sublayer 14c and the nonmagnetic layer 15 is improved. Consequently, it is possible to increase the read output amplitude of the magnetic sensing element.

In the $Co_2Mn(Si_{1-x}Sn_x)$ alloy, the proportion of Co is twice the proportion of Mn and twice the sum of the proportions of Si and Sn, and the proportion of Mn is equal to the sum of the proportions of Si and Sn.

When the free magnetic layer 16 is a $Co_2Mn(Si_{1-x}Sn_x)$ alloy layer and the nonmagnetic layer 15 is composed of Cu, preferably, the absolute value of the difference between interplanar spacing d1 of the nonmagnetic layer 15 in the direction perpendicular to the surfaces of the layer and the interplanar spacing d2 of the free magnetic layer 16 in the direction perpendicular to the surfaces of the layer may be 0.032 Å or less. When the second pinned magnetic sublayer 14c is a $Co_2Mn(Si_{1-x}Sn_x)$ alloy layer and the nonmagnetic layer 15 is composed of Cu, the absolute value of the difference between the interplanar spacing d1 of the nonmagnetic layer 15 in the direction perpendicular to the surfaces of the layer and the interplanar spacing d3 of the second pinned magnetic sublayer 14c in the direction perpendicular to the surfaces of the layer may be 0.032 Å or less.

Figure 3:
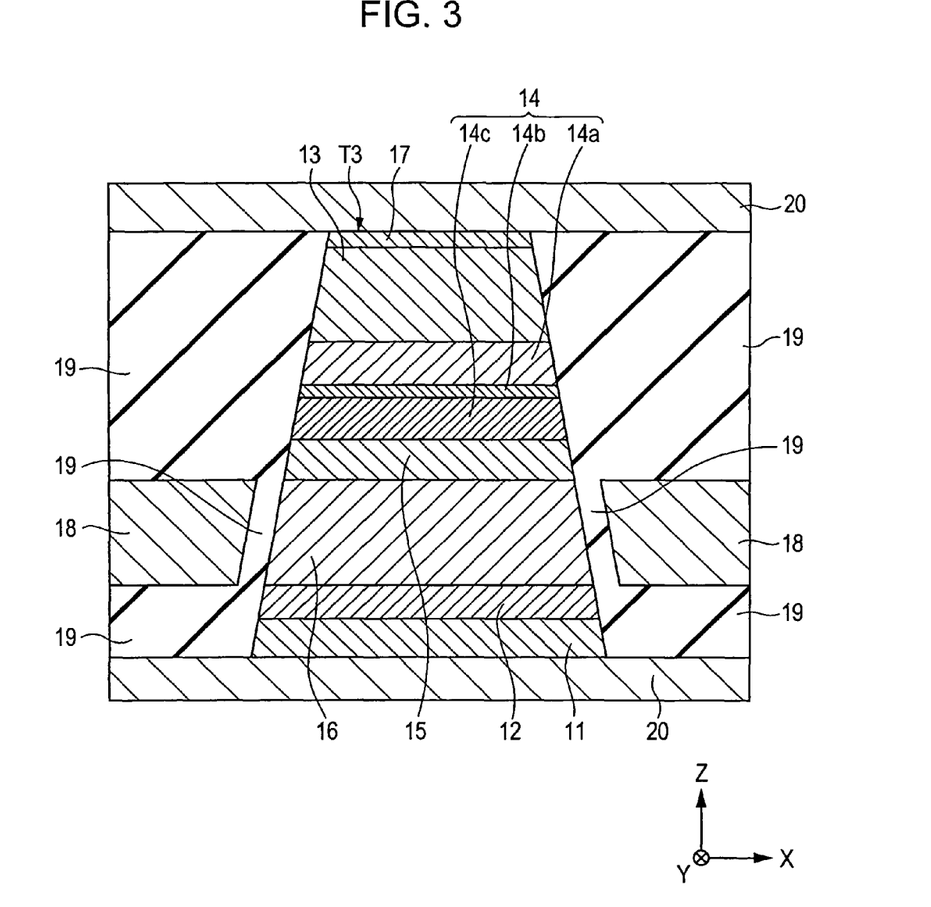
FIG. 3 is a sectional view of a magnetic sensing element (single spin-valve magnetoresistive element) according to a third example, viewed from the surface facing a recording medium.

FIG. 3 is a partial sectional view which shows a structure of a top spin-valve magnetic sensing element according to a third embodiment.

In FIG. 3, the layers represented by the same reference numerals as those in FIG. 1 are composed of the same materials as those described with reference to FIG. 1.

An underlayer 11, a seed layer 12, a free magnetic layer 16, a nonmagnetic layer 15, a pinned magnetic layer 14, an antiferromagnetic layer 13, and a protective layer 17 are sequentially disposed from the bottom to constitute a multilayer film T3.

Hard bias layers 18 are disposed at both sides of the free magnetic layer 16. Each hard bias layer 18 is isolated by an insulating layer 19 composed of alumina or the like.

Electrode layers 20 are disposed on the top and bottom of the multilayer film T3. Thus, a CPP (current-perpendicular-to-the-plane)-GMR magnetic sensing element is provided, in which a sensing current flows perpendicular to the surfaces of the individual layers constituting the multilayer film T3.

After layers from the underlayer 11 to the protective layer 17 are deposited, annealing is performed to produce an exchange coupling magnetic field at the interface between the antiferromagnetic layer 13 and the pinned magnetic layer 14. In the annealing process, by orienting the magnetic field in a direction parallel to the Y direction, the magnetization direction of the pinned magnetic layer 14 may be oriented and pinned in the direction parallel to the Y direction.

By using a $Co_2Mn(Si_{1-x}Sn_x)$ alloy or a $Co_2Mn(Ge_{1-x}Sn_x)$ alloy for the second pinned magnetic sublayer 14c or the free magnetic layer 16, the lattice constant of the second pinned magnetic sublayer 14c or the free magnetic layer 16 is controlled. In this manner, the degree of lattice matching between the nonmagnetic layer 15 and the free magnetic layer 16 or the degree of lattice matching between the nonmagnetic layer 15 and the second pinned magnetic sublayer 14c is improved, and the free magnetic layer 16 or the second pinned magnetic sublayer 14c can easily have the $L_{21}$-type crystal structure, thus improving the spin-dependent bulk scattering coefficient β in the free magnetic layer 16 or the second pinned magnetic sublayer 14c. Furthermore, the $Co_2Mn(Ge_{1-x}Sn_x)$ alloy or the $Co_2Mn(Si_{1-x}Sn_x)$ alloy may not easily diffuse into the nonmagnetic layer 15, and thus the spin-dependent interface scattering coefficient γ at the interface between the free magnetic layer 16 and the nonmagnetic layer 15 or at the interface between the second pinned magnetic sublayer 14c and the nonmagnetic layer 15 is improved. Consequently, it may be possible to increase the read output amplitude of the magnetic sensing element.

EXAMPLE 1

A magnetic sensing element having a film structure described below was formed, and the product ΔRA of the area A of the magnetic sensing element and the amount of change in resistance ΔR was measured when the subscript x of a $Co_2Mn(Ge_{1-x}Sn_x)$ alloy constituting the free magnetic layer was varied from 0 to 1.

Film structure: substrate/underlayer Ta (30 Å)/seed layer NiFeCr (50 Å)/antiferromagnetic layer IrMn (70 Å)/first pinned magnetic sublayer $Co_{70}Fe_{30}$/nonmagnetic intermediate sublayer Ru (9.1 Å)/second pinned magnetic sublayer [$Co_{60}Fe_{40}$ (10 Å)/$Co_2Mn(Ge_{1-x}Sn_x)$ alloy (40 Å)]/nonmagnetic layer Cu (43 Å)/free magnetic layer $Co_2Mn(Ge_{1-x}Sn_x)$ alloy (80 Å)/nonmagnetic layer Cu (43 Å)/second pinned magnetic sublayer [$Co_2Mn(Ge_{1-x}Sn_x)$ alloy (40 Å)/$Co_{60}Fe_{40}$ (10 Å)]/nonmagnetic intermediate sublayer Ru (9.1 Å)/first pinned magnetic sublayer $Co_{60}Fe_{40}$/antiferromagnetic layer IrMn (70 Å)/protective layer Ta (200 Å) The interplanar spacing of the free magnetic layer in the direction perpendicular to the surfaces of the layer was determined when the subscript x of the $Co_2Mn(Ge_{1-x}Sn_x)$ alloy was varied from 0 to 1.

Figure 6:
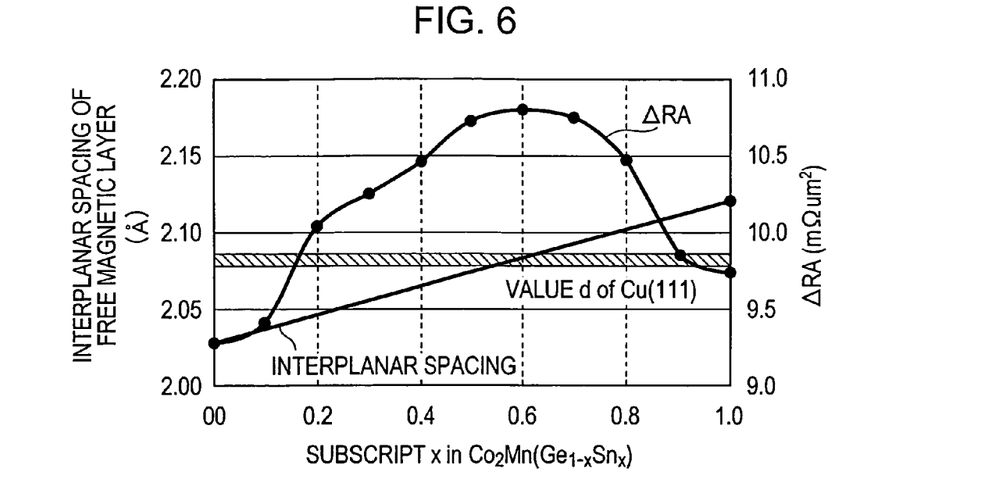
FIG. 6 is a graph showing the product ΔRA of the area A of a magnetic sensing element and the amount of change in resistance ΔR with the subscript x of a $Co_2Mn(Ge_{1-x}Sn_x)$ alloy constituting a free magnetic layer being varied from 0 to 1.

The results are shown in FIG. 6. In the graph of FIG. 6, the horizontal axis indicates the subscript x in the $Co_2Mn(Ge_{1-x}Sn_x)$ alloy constituting the free magnetic layer, the left vertical axis indicates the interplanar spacing of the free magnetic layer in the direction perpendicular to the surfaces of the layer, and the right vertical axis indicates the product ΔRA of the area A of the magnetic sensing element and the amount of change in resistance ΔR.

When the subscript x of the $Co_2Mn(Ge_{1-x}Sn_x)$ alloy constituting the free magnetic layer is in the range of 0.2 to 0.8, the product ΔRA of the magnetic sensing element is 10.0 mΩμm² or more.

As the subscript x of the $Co_2Mn(Ge_{1-x}Sn_x)$ alloy increases, i.e., as the proportion of Sn increases, the interplanar spacing of the free magnetic layer in the direction perpendicular to the surfaces of the layer also increases. The interplanar spacing of the nonmagnetic layer in the direction perpendicular to the surfaces of the layer is about 2.083 to about 2.088 Å.

When the interplanar spacing of the free magnetic layer in the direction perpendicular to the surfaces of the layer is equal to the interplanar spacing d of the nonmagnetic layer composed of Cu in the direction perpendicular to the surfaces of the layer, the product ΔRA of the magnetic sensing element is at the highest level.

When the absolute value of the difference between the interplanar spacing of the nonmagnetic layer in the direction perpendicular to the surfaces of the layer and the interplanar spacing of the free magnetic layer in the direction perpendicular to the surfaces of the layer is about 0.025 Å or less, the product ΔRA of the magnetic sensing element is 10.0 mΩμm² or more.

When the absolute value of the difference between the interplanar spacing of the nonmagnetic layer in the direction perpendicular to the surfaces of the layer and the interplanar spacing of the free magnetic layer in the direction perpendicular to the surfaces of the layer is about 0.015 Å or less, the product ΔRA of the magnetic sensing element is 10.5 mΩμm² or more.

EXAMPLE 2

A magnetic sensing element having a film structure described below was formed, and the product ΔRA of the area A of the magnetic sensing element and the amount of change in resistance ΔR was measured when the subscript x of a $Co_2Mn(Si_{1-x}Sn_x)$ alloy constituting the free magnetic layer was varied from 0 to 1.

Film structure: substrate/underlayer Ta (30 Å)/seed layer NiFeCr (50 Å)/antiferromagnetic layer IrMn (70 Å)/first pinned magnetic sublayer $Co_{70}Fe_{30}$/nonmagnetic intermediate sublayer Ru (9.1 Å)/second pinned magnetic sublayer [$Co_{60}Fe_{40}$ (10 Å)/$Co_2Mn(Si_{1-x}Sn_x)$ alloy (40 Å)]/nonmagnetic layer Cu (43 Å)/free magnetic layer $Co_2Mn(Si_{1-x}Sn_x)$ alloy (80 Å)/nonmagnetic layer Cu (43 Å)/second pinned magnetic sublayer [$Co_2Mn(Si_{1-x}Sn_x)$ alloy (40 Å)/$Co_{60}Fe_{40}$ (10 Å)]/nonmagnetic intermediate sublayer Ru (9.1 Å)/first pinned magnetic sublayer $Co_{60}Fe_{40}$/antiferromagnetic layer IrMn (70 Å)/protective layer Ta (200 Å) The interplanar spacing of the free magnetic layer in the direction perpendicular to the surfaces of the layer was also determined when the subscript x of the $Co_2Mn(Si_{1-x}Sn_x)$ alloy was varied from 0 to 1.

Figure 7:
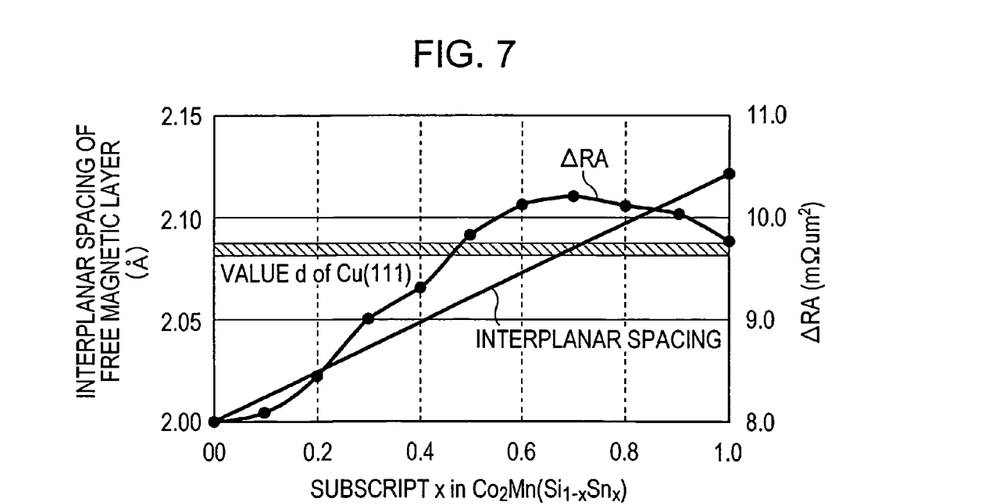
FIG. 7 is a graph showing the product ΔRA of the area A of a magnetic sensing element and the amount of change in resistance ΔR with the subscript x of a $Co_2Mn(Si_{1-x}Sn_x)$ alloy constituting a free magnetic layer being varied from 0 to 1.

The results are shown in FIG. 7. The horizontal axis indicates the subscript x in the $Co_2Mn(Si_{1-x}Sn_x)$ alloy constituting the free magnetic layer, the left vertical axis indicates the interplanar spacing of the free magnetic layer in the direction perpendicular to the surfaces of the layer, and the right vertical axis indicates the product ΔRA of the area A of the magnetic sensing element and the amount of change in resistance ΔR.

When the subscript x of the $Co_2Mn(Si_{1-x}Sn_x)$ alloy constituting the free magnetic layer is in the range of 0.3 to 0.9, the product ΔRA of the magnetic sensing element is 9.0 mΩμm² or more.

As the subscript x of the $Co_2Mn(Si_{1-x}Sn_x)$ alloy increases, i.e., the proportion of Sn increases, the interplanar spacing of the free magnetic layer in the direction perpendicular to the surfaces of the layer also increases. When the interplanar spacing of the free magnetic layer in the direction perpendicular to the surfaces of the layer is equal to the interplanar spacing d of the nonmagnetic layer composed of Cu in the direction perpendicular to the surfaces of the layer, the product ΔRA of the magnetic sensing element is at the highest level.

When the absolute value of the difference between the interplanar spacing of the nonmagnetic layer in the direction perpendicular to the surfaces of the layer and the interplanar spacing of the free magnetic layer in the direction perpendicular to the surfaces of the layer is about 0.032 Å or less, the product ΔRA of the magnetic sensing element is 9.0 mΩμm² or more.

Although the present invention has been explained by way of the examples described above, it should be understood to the ordinary skilled person in the art that the invention is not limited to the examples, but rather that various changes or modifications thereof are possible without departing from the spirit of the invention. Accordingly, the scope of the invention shall be determined only by the appended claims and their equivalents.

What is claimed is:

1. A current-perpendicular-to-the-plane magnetic sensing element comprising a multilayer film including:
   a pinned magnetic layer; and a free magnetic layer disposed on the pinned magnetic layer with a nonmagnetic layer therebetween, wherein the nonmagnetic layer is composed of Cu and has a face-centered cubic lattice crystal structure in which the $\{111\}$ planes are oriented in a direction parallel to the surfaces of the layer; at least one of the pinned magnetic layer and the free magnetic layer includes a $Co_2Mn(Ge_{1-x}Sn_x)$ alloy layer, the subscript x satisfying the range of $0.2 \leq x \leq 0.8$; and the $Co_2Mn(Ge_{1-x}Sn_x)$ alloy layer has a body-centered cubic lattice crystal structure in which the $\{110\}$ planes are oriented in a direction parallel to the surfaces of the layer.

2. The magnetic sensing element according to claim 1, wherein the pinned magnetic layer is disposed below the free magnetic layer.

3. A current-perpendicular-to-the-plane magnetic sensing element comprising a multilayer film including:

a pinned magnetic layer; and a free magnetic layer disposed on the pinned magnetic layer with a nonmagnetic layer therebetween, wherein the nonmagnetic layer is composed of Cu and has a face-centered cubic lattice crystal structure in which the $\{111\}$ planes are oriented in a direction parallel to the surfaces of the layer; at least one of the pinned magnetic layer and the free magnetic layer includes a $Co_2Mn(Si_{1-x}Sn_x)$ alloy layer, the subscript x satisfying the range of $0.3 \leq x \leq 0.9$; and the $Co_2Mn(Si_{1-x}Sn_x)$ alloy layer has a body-centered cubic lattice crystal structure in which the $\{110\}$ planes are oriented in a direction parallel to the surfaces of the layer.

* * * * *